United States Patent
Aue et al.

(10) Patent No.: US 7,593,843 B2
(45) Date of Patent: Sep. 22, 2009

(54) STATISTICAL LANGUAGE MODEL FOR LOGICAL FORM USING TRANSFER MAPPINGS

(75) Inventors: Anthony Aue, Seattle, WA (US); Eric K. Ringger, Issaquah, WA (US); Christopher B. Quirk, Seattle, WA (US); Arul A. Menezes, Sammamish, WA (US); Robert C. Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 736 days.

(21) Appl. No.: 10/813,208

(22) Filed: Mar. 30, 2004

(65) Prior Publication Data

US 2005/0228640 A1    Oct. 13, 2005

(51) Int. Cl.
*G06F 17/28* (2006.01)
(52) U.S. Cl. .................... 704/2; 704/4; 704/7
(58) Field of Classification Search .............. 704/2, 704/4, 277, 3, 5, 7
See application file for complete search history.

(56) References Cited

U.S. PATENT DOCUMENTS

| | | | | |
|---|---|---|---|---|
| 4,599,691 A | * | 7/1986 | Sakaki et al. | 704/2 |
| 5,285,386 A | * | 2/1994 | Kuo | 704/2 |
| 5,289,375 A | * | 2/1994 | Fukumochi et al. | 704/2 |
| 5,329,446 A | * | 7/1994 | Kugimiya et al. | 704/4 |
| 5,418,717 A | * | 5/1995 | Su et al. | 704/9 |
| 5,477,451 A | * | 12/1995 | Brown et al. | 704/9 |
| 5,625,553 A | * | 4/1997 | Kutsumi et al. | 704/2 |
| 5,848,385 A | * | 12/1998 | Poznanski et al. | 704/4 |
| 6,233,545 B1 | * | 5/2001 | Datig | 704/2 |
| 6,330,530 B1 | * | 12/2001 | Horiguchi et al. | 704/4 |
| 2003/0023422 A1 | * | 1/2003 | Menezes et al. | 704/2 |
| 2003/0061023 A1 | * | 3/2003 | Menezes et al. | 704/4 |
| 2004/0098247 A1 | * | 5/2004 | Moore | 704/4 |

OTHER PUBLICATIONS

Brown et al., P. F., "The Mathematics of Statistical Machine Translation: Parameter Estimation", Association for Computational Linguistics, vol. 19, pp. 263-311, 1993.
Charniak, E., "Immediate-Head Parsing for Language Models", Meeting of the Association for Computational Linguistics, 2001.
Charniak et al., E., "Syntax-based Language Models for Statistical Machine Translation", Proceedings of MT Summit IX 2003, 2003.
Chelba et al., C. "Exploiting Syntactic Structure for Language Modeling" Proceedings of the Thirty-Sixth Annual Meeting of the Association for Computational Linguistics and Seventeenth International Conference on Computational Linguistics, pp. 225-231, 1998.

(Continued)

*Primary Examiner*—Richemond Dorvil
*Assistant Examiner*—Douglas C Godbold
(74) *Attorney, Agent, or Firm*—Leanne Taveggia Farrell; Westman, Champlin & Kelly, P.A.

(57) ABSTRACT

A method of decoding an input semantic structure to generate an output semantic structure. A set of transfer mappings are provided. A score is calculated for at least one transfer mapping in the set of transfer mappings using a statistical model. At least one transfer mapping is selected based on the score and used to construct the output semantic structure.

38 Claims, 9 Drawing Sheets

OTHER PUBLICATIONS

Eisner, J., "Learning Non-Isomorphic Tree Mappings for Machine Translation", Proceedings of the 41st Meeting of the Association for Computational Linguistics (ACL 2003), Companion Volume, Jul. 2003.

Goodman, J., "A Bit of Progress in Language Modeling", Technical Report, MSR-TR-2001-72, Dec. 2001.

Klein et al., D., "Accurate Unlexicalized Parsing", Proceedings of the 41$^{st}$ Annual Meeting of the Association for Computational Linguistics, pp. 423-430, Jul. 2003.

Knight, K. "Decoding Complexity in Word-Replacement Translation Models", Association for Computational Linguistics, 25(4), pp. 607-615, 1999.

Moore, R., "Towards a Simple and Accurate Statistical Approach to Learning Translation Relationships among Words", Proceedings, Workshop on Data-driven Machine Translation, 39$^{th}$ Annual Meeting and 10$^{th}$ Conference of the European Chapter, Association for Computation Linguistics, pp. 79-86, 2001.

Och et al., F., "Discriminative Training and Maximum Entropy Models for Statistical Machine Translation", Proceedings of the 40$^{th}$ Annual Meeting of the Association for Computation Linguistics, Philadelphia, pp. 295-302, Jul. 2002.

Papineni et al., K. A., "Bleu: a Method for Automatic Evaluation of Machine Translation", Technical Report, RC22176 (W0109-022), IBM Research Division, Thomas J. Watson Research Center, Sep. 17, 2001.

Powell, M. J. D., "An efficient method for finding the minimum of a function of several variables without calculating derivatives", Computer Journal, vol. 7 pp. 155-162, 1964.

Richardson et al., S., "Achieving commercial-quality translation with example-based methods", Proceedings of MT Summit VIII, pp. 293-298, 2001.

Stolcke, A., "Entropy-based Pruning of Backoff Language Models", DARPA Broadcast News Transcription and Understanding Workshop, pp. 270-274, 1998.

Yamada et al., K., "A Syntax-Based Statistical Translation Model", Proceedings of the 39th Annual Meeting of the Association for Computational Linguistics, pp. 523-529, 2001.

Langkilde I et al. "Generation that Exploits Corpus-Based Statistical Knowledge." pp. 704-710. 1998 <http://acl.ldc.upenn.edu/P/P98/P98-1116.pdf> Retrieved on Oct. 23, 2003.

European Search Report dated Jul. 21, 2008 in EP05102340, filed Mar. 23, 2005.

* cited by examiner

1700

E ====> E'

1800

E ====> E''

1900

E ====> E'''

2000

F ====> F'

STATISTICAL LANGUAGE MODEL FOR LOGICAL FORM USING TRANSFER MAPPINGS

BACKGROUND OF THE INVENTION

The present invention relates to automated language systems. More specifically, the present invention relates to language models in statistical language systems.

Automated language systems include speech recognition, handwriting recognition, speech production, grammar checking and machine translation.

Machine translation (MT) systems are systems that receive an input in one language (a "source" language), translate the input to a second language (a "target" language), and provide an output in the second language.

One example of a MT system uses logical forms (LFs), which are dependency graphs that describe labeled dependencies among content words in a string as an intermediate step in translation. Under this system, a string in the source language is first analyzed with a natural language parser to produce a source LF. The source LF must then be converted into a target language LF. A database of mappings from source language LF pieces to target language LF pieces (along with other metadata, such as sizes of mappings and frequencies of mappings in some training sets) is used for this conversion. All mappings whose source language LF pieces are a sub-graph of the source LF are first retrieved. Typically, the source language LF piece of a single mapping does not cover the entire source LF. As a result, a set of mappings (possibly overlapping) must be selected and their target language LF pieces must be combined to form a complete target LF.

To identify the set of target logical forms, an MT system uses a greedy search algorithm to select a combination of mappings from the possible mappings whose source language LF pieces match the source LF. This greedy search begins by sorting the mappings by size, frequency, and other features that measure how well the source language LF pieces of the mapping match the source LF. The sorted list is then traversed in a top-down manner and the first set of compatible mappings found that covers the source logical form is chosen. This heuristic system, however, does not test all possible combinations of input mappings, but simply selects the first set of mappings that completely cover the source LF.

After the set of mappings is selected, the target language LF pieces of the mappings are combined in a manner consistent with the source LF to produce a target LF. Finally, running a natural language generation system on the target LF produces the target language output.

However, MT systems do not always employ logical forms or other parsed structures as intermediate representations. Nor do they necessarily use heuristic methods to resolve translation ambiguities. Some other MT systems try to predict the most likely target language string given an input string in the source language using statistical models. Such MT systems use traditional statistical frameworks and models, such as the noisy-channel framework, to decode and find the target sentence T that is the most probable translation for a given source sentence S. Maximizing this probability is represented by:

$$T = \arg\max_{T'} P(T' \mid S) \quad \text{Equation 1}$$

where T' ranges over sentences in the target language. By using Bayes Rule, maximizing this probability can also be represented by:

$$T = \arg\max_{T'} P(S \mid T') \times P(T') \quad \text{Equation 2}$$

where $P(S|T')$ is the probability of the source string S given a target language string T' and $P(T')$ is the probability of the target language string T'. In string-based statistical MT (MT where no parsed intermediate representation is used), a target language model trained on monolingual target language data is used to compute an estimate of $P(T)$, and alignment models of varying complexity are used to compute and estimate $P(S|T)$.

There are a number of problems associated with conventional, string-based statistical MT systems. In particular, the search space (all possible strings in the target language) is quite large. Without restricting this search space, a practical MT system cannot be built because it takes too long to consider all possible translation strings. To address this, many systems use a simplifying assumption that the probabilities of the channel model and the target language model for an entire string can be determined as the product of probabilities of sub-strings within the string. This assumption is only valid as long as the dependencies in the strings and between the strings are limited to the local areas defined by the sub-strings. However, sometimes the best translation for a chunk of source language text is conditioned on elements of the source and target language strings that are relatively far away from the element to be predicted. Since the simplifying assumptions made in string-based statistical MT models are based in large part on string locality, sometimes the conditioning elements are far enough from the element to be predicted that they cannot be taken into account by the models.

For example, some string-based statistical MT systems use string n-gram models for their language model (LM). These n-gram models are simple to train, use and optimize. However, n-gram models have some limitations. Although a word can be accurately predicted from one or two of its immediate predecessors, a number of linguistic constructions place highly predictive words sufficiently far from the words they predict that they are excluded from the scope of the string n-gram model. Consider the following active and passive sentences:

1. John hit the ball.
2. The balls were hit by Lucy.

The following trigrams occur in these sentences with the indicated frequencies:

| | | |
|---|---|---|
| <P> <P> John 1 | | <P > <P> The 1 |
| <P> John hit 1 | | <P >The balls 1 |
| John hit the 1 | | the balls were 1 |
| hit the ball 1 | | balls were hit 1 |
| the ball <POST>  1 | | were hit by 1 |
| | | hit by Lucy 1 |
| | | by Lucy <POST>  1 | wherein "<P>" is an imaginary token at the beginning of a sentence providing sentence-initial context, and "<POST>" is an imaginary token at the end of a sentence. It should be noted that each of these trigrams occurs only once, even though the event (the hitting of a ball) is the same in both cases.

In another statistical MT system, a syntax structure in the source language is mapped to a string in the target language. Syntax-based models have several advantages over string-based models. In one aspect, syntax-based models can reduce the magnitude of the sparse data problem by normalizing lemmas. In another aspect, syntax-based models can take the syntactic structure of the language into account. Therefore, events that depend on each other are often closer together in a syntax tree than they are in the surface string because the distance to a common parent can be shorter than the distance in the string.

However, even in a syntax-based model, drawbacks remain: the distance between interdependent words can still be too large to be captured by a local model; also, similar concepts are expressed by different structures (e.g., active vs. passive voice) and are, therefore, not modeled together. These result in poor training of the model and poor translation performance.

SUMMARY OF THE INVENTION

The present invention includes a method for decoding an input semantic structure to produce an output semantic structure. The technique employs a set of transfer mappings for portions of the input semantic structure. A score is calculated for at least one transfer mapping in the set of transfer mappings using a statistical model. At least one transfer mapping is selected based on the score and used to construct the output semantic structure. The present invention can also be embodied as a computer-implemented method and as a machine translation system. A further aspect of the present invention is a language model constructed from semantic structures.

DETAILED DESCRIPTION OF ILLUSTRATIVE EMBODIMENTS

It should be noted that to the extent that the present invention is described in the context of machine translation systems the present invention is also applicable to other systems that produce words or that require a language model. For example, systems can include speech recognition, optical character recognition (OCR), grammar checking and etc. Prior to describing the present invention in detail, embodiments of illustrative computing environments within which the present invention can be applied will be described.

Figure 1:
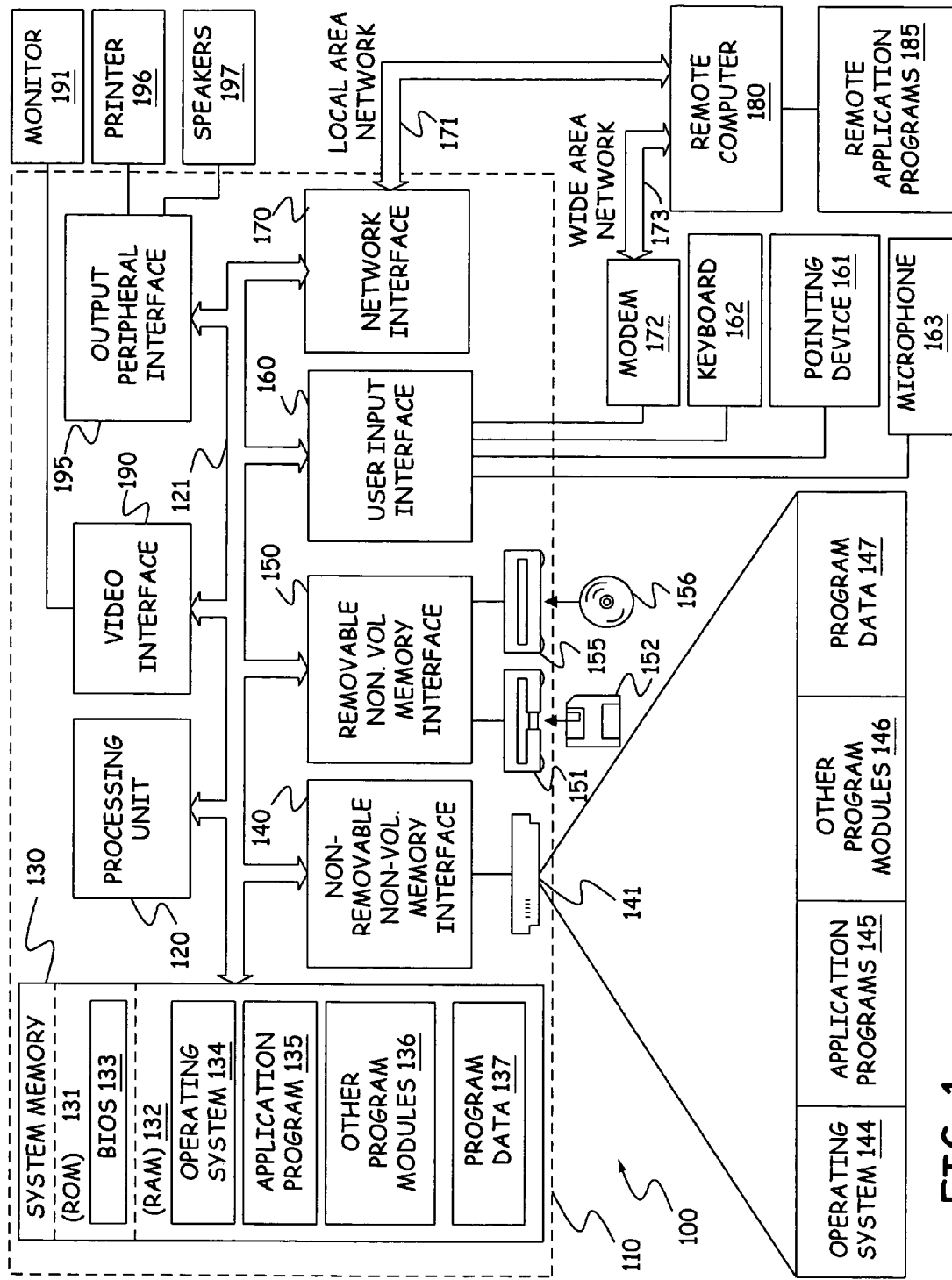
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
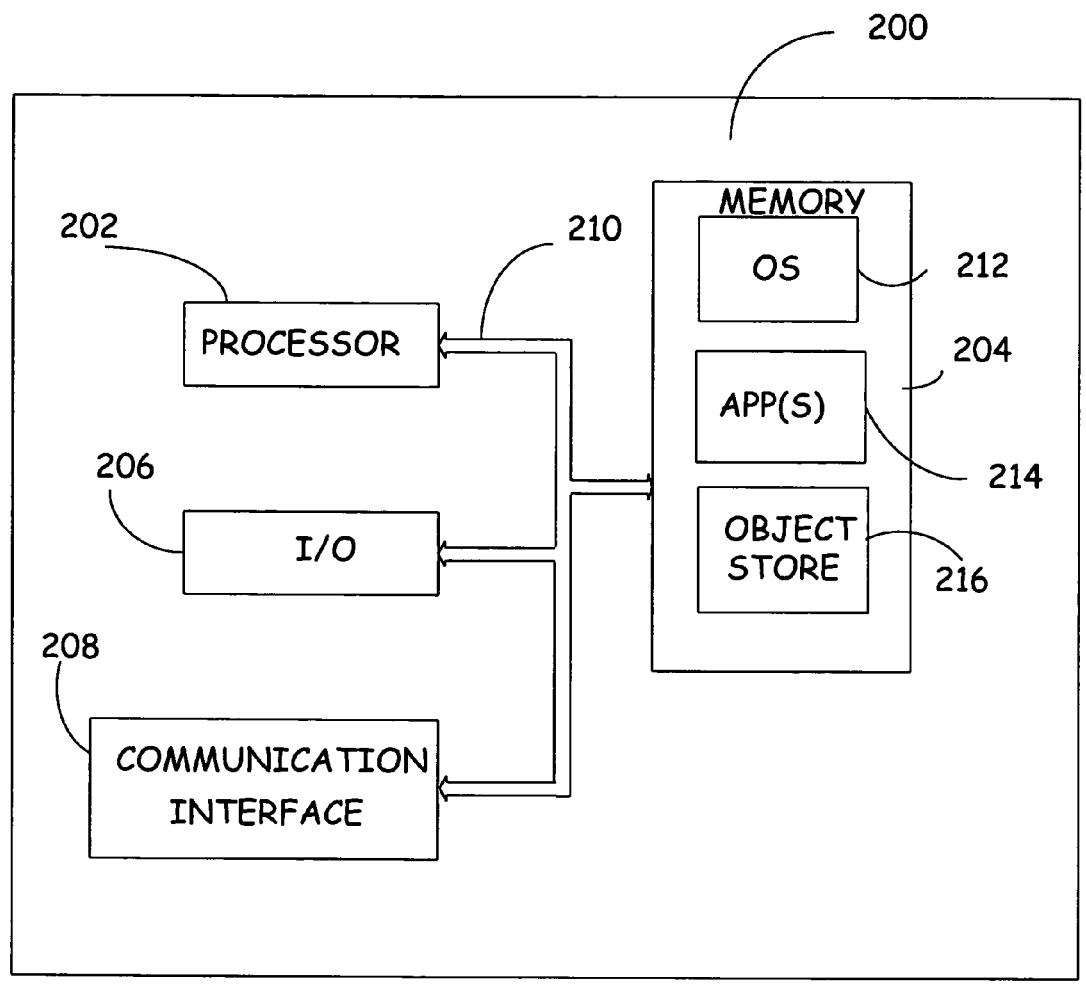
FIG. 2 illustrates a block diagram of a mobile device in which the present invention can be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Logical Forms

Prior to discussing the present invention in greater detail, a brief discussion of a logical form may be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological analysis on an input text to produce conventional phrase structure analyses augmented with grammatical relations. Syntactic analyses undergo further processing in order to obtain logical forms, which are data structures that describe labeled dependencies among content words in the textual input.

In general, a logical form is a data structure of connected logical relations representing a single input, such as a sentence or portion thereof. The logical form minimally consists of one logical relation and portrays structural relationships (i.e., syntactic and semantic relationships), particularly argument and/or adjunct relation(s) between important words in an input string.

Figure 3:
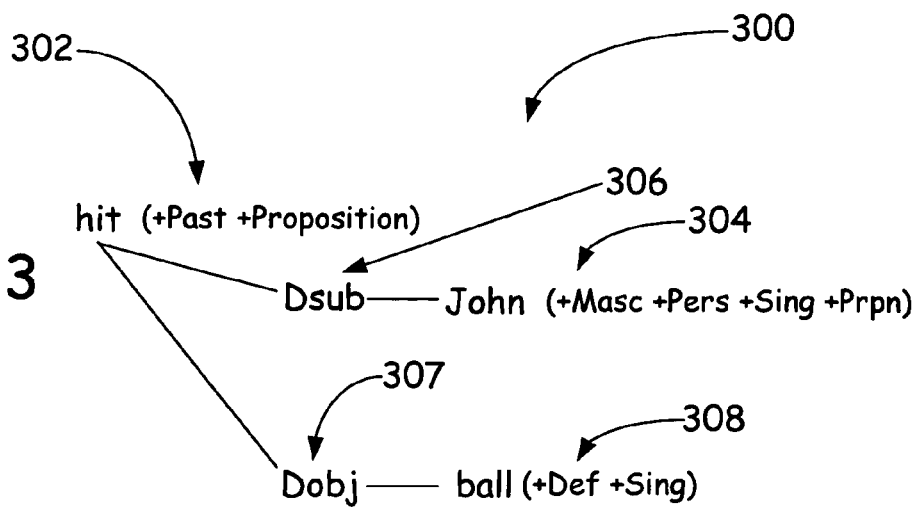
FIGS. 3 and 4 illustrate examples of logical forms.
Figure 4:
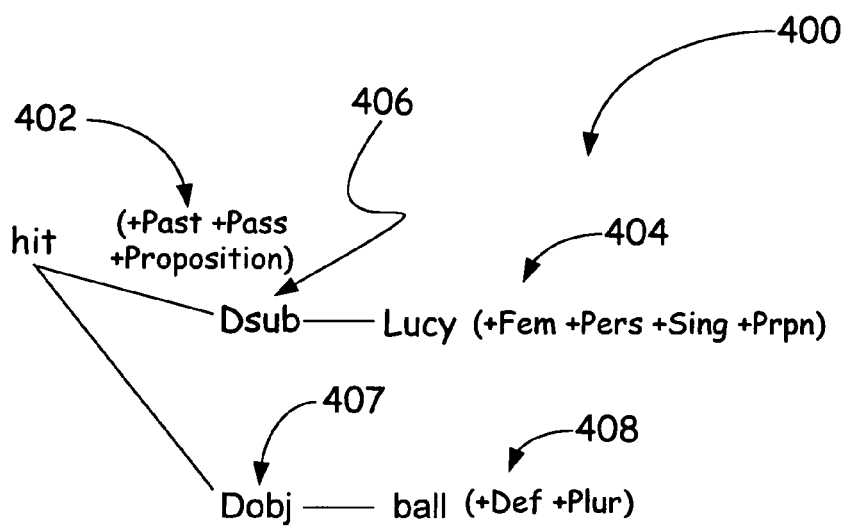

Logical forms can normalize certain syntactical alternations, (e.g., active/passive) and resolve both intrasentential anaphora and long distance dependencies. For example, FIGS. 3 and 4 illustrate logical forms or dependency graphs 300 and 400 for the active and passive sentences given as examples in the Background section to help in understanding the elements of logical forms. However, as appreciated by those skilled in the art, when stored on a computer readable medium, the logical forms may not readily be understood as representing a graph. FIGS. 3 and 4 illustrate important generalizations that the surface string and the syntax models, as described in the Background section, can not capture.

To see why dependency graphs might provide a better language model than string-based n-gram models or syntax trees, consider the following sentences:

1. John hit the ball.
2. The balls were hit by Lucy.

A surface-string-based 3-gram model would generate the following counts:

| | | |
|---|---|---|
| | <P> <P> | The 1 |
| <P><P> John 1 | <P> | The balls 1 |
| <P> John hit 1 | the balls were 1 | |
| John hit the 1 | balls were hit 1 | |
| hit the ball 1 | were hit by 1 | |
| the ball <POST> 1 | hit by Lucy 1 | |
| | by Lucy <POST> 1 | |

Note that each of these trigrams occurs only once, even though the event (the hitting of a ball) is the same in both cases.

If we look at syntax trees, we get a slightly different picture. Specifically, for the sentences above, the following syntax trees would be produced:

```
John hit the ball.
Decl1
|___NP1 ___NOUN1      "John"
|___VERB1      "hit"
|___NP2 ___DETP1 ___ADJ1*      "the"
|       |___NOUN2      "ball"
|___CHAR1      "."
The balls were hit by Lucy.
Decl1
|___NP1___DETP1___ADJ1*      "The"
|    |___NOUN1      "balls"
|___AUX1 ___VERB1      "were"
|___VERB2*      "hit"
|___PP1___PP2___PREP1*      "by"
|    |___NOUN2*      "Lucy"
|___CHAR1      "."
```

Note that here too, the hitting of the ball is spit into two separate buckets (one set of rules for the active voice and another for the passive voice), and so the system would fail to learn a useful generalization.

FIGS. 3 and 4 illustrate logical forms 300 and 400. LFs 300 and 400 include parent nodes 302 and 402, children nodes 304, 308, 404 and 408 and semantic relationship nodes 306, 307, 406, and 407. Semantic relationship nodes 306 and 406 operate to connect children nodes 304, 308, 404, and 408 to parent nodes 302 and 402 and explain the semantic relationship between parent and children nodes.

Parent nodes 302 and 402 contain word forms or lemmas. For example, the lemma in parent nodes 302 and 402 is the word "hit". Child nodes 304, 308, 404, and 408 also contain word forms or lemmas. The semantic relationship nodes 306 and 406 illustrate that child nodes 304 and 404 are deep subjects and semantic relationship nodes 307 and 407 indicate that child nodes 308 and 408 are deep objects of parent nodes 302 and 402. In addition, LFs 300 and 400 also include binary features (or "bits") attached to each lemma in each node. For example, the binary features are attached to each lemma of LFs 300 and 400 and are illustrated in parentheticals. Binary features describe the syntactic properties of a lemma. For example, the word form in node 302 includes bits that describe the word "hit" as past tense and as a proposition.

In contrast to strings and syntax trees, logical forms 300 and 400 include both the active voice construction and the passive voice construction in the same graph structure. LF structures can be degraphed to produce a tree, such that no node can have two parents. Logical forms 300 and 400 are hierarchical logical representations of the corresponding sentences (or sentence fragments). Each node depends on all of its ancestors. For the purpose of building a (target) language model, the local structure is modeled based on the approximation that each child node depends only on its parent (or on n−1 ancestors, for an n-gram LF model).

In one illustrative embodiment, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations.

Machine Translation

Figure 5:
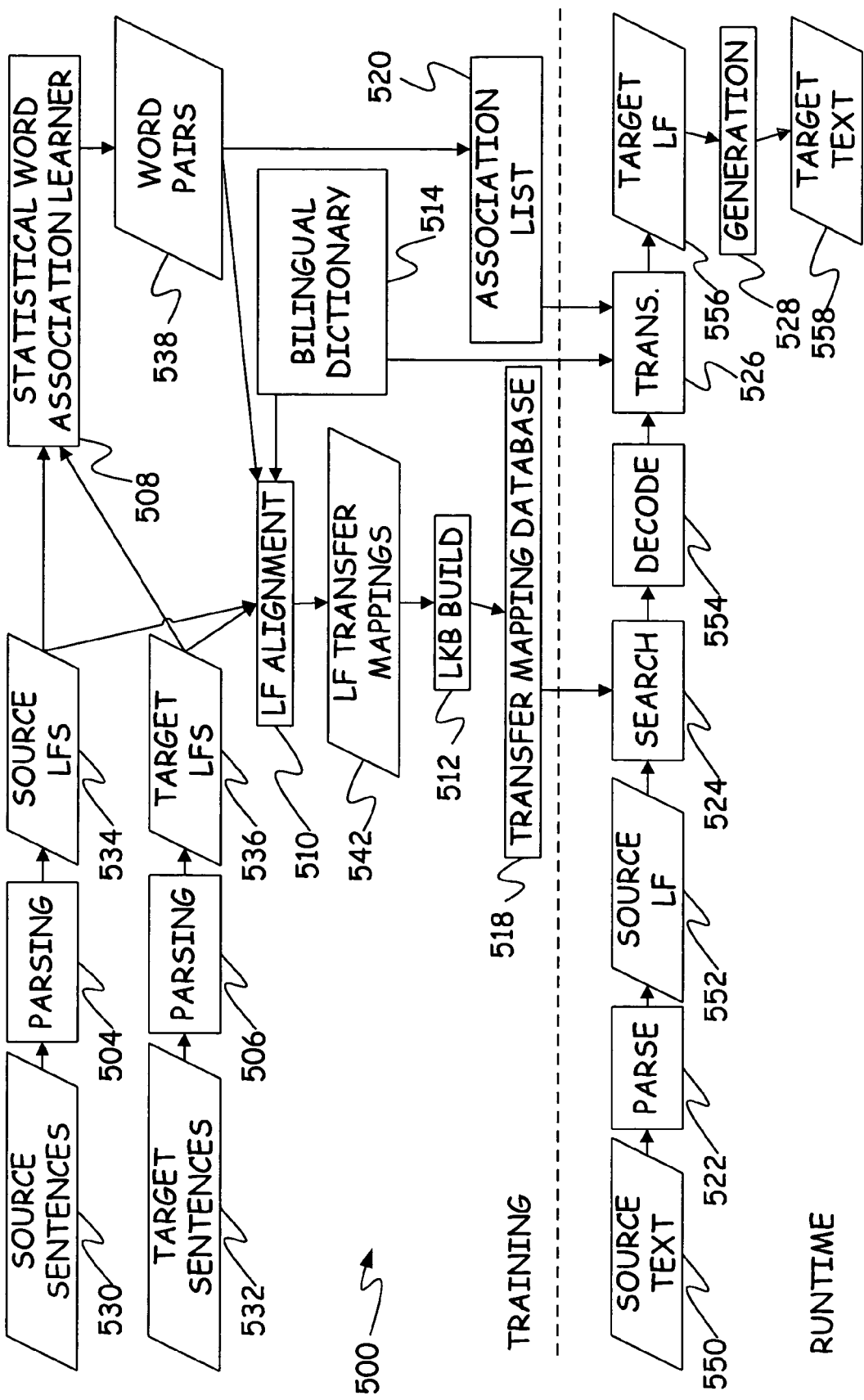
FIG. 5 illustrates a block diagram of a machine translation architecture in accordance with an embodiment of the present invention.

FIG. 5 is a block diagram of an exemplary architecture of a machine translation system 500 in accordance with an embodiment of the present invention. System 500 includes parsing components 504 and 506, statistical word association learning component 508, logical form alignment component 510, lexical knowledge base (LKB) building component 512, bilingual dictionary 514, association list 520, and transfer mapping database 518. During translation run time, the system 500 utilizes parse component 522, search component 524, decoding component 554, transfer component 526 and generation component 528.

In one illustrative embodiment, a bilingual corpus is used to train the system. The bilingual corpus (or "bitext") includes aligned translated sentences (e.g., sentences in a source or target language, such as English, in 1-to-1 correspondence with their human-created translations in the other of the source or target language, such as Spanish). During training, sentences are provided from the aligned bilingual corpus into system 500 as source sentences 530 (the sentences to be translated), and as target sentences 532 (the translation of the source sentences). Parsing components 504 and 506 parse the source sentences and the target sentences from the aligned bilingual corpus to produce source logical forms 534 and target logical forms 536.

During parsing, the words in the sentences are converted to normalized word forms or lemmas and can be provided to statistical word association learning component 508. Both single word and multi-word associations are iteratively hypothesized and scored by learning component 508 until a reliable set of each is obtained. Statistical word association learning component 508 outputs learned word translation pairs 538.

Word pairs are added to an association list 520, which acts as an updated bilingual dictionary.

The word pairs 538, along with source logical forms 534 and target logical forms 536 are provided to logical form alignment component 510. Briefly, component 510 first establishes tentative correspondences between nodes in the source and target logical forms 530 and 536, respectively. This is done using translation pairs from a bilingual lexicon (e.g. bilingual dictionary) 514, which can be augmented with word pairs 538 from statistical word association learning component 508. After establishing possible correspondences, alignment component 510 aligns logical form nodes according to both lexical and structural considerations and creates word and/or logical form transfer mappings 542.

Basically, alignment component 510 draws links between logical forms using the bilingual dictionary information 514 and word pairs 538. The transfer mappings are optionally filtered based on a frequency with which they are found in the source and target logical forms 534 and 536 and are provided to a lexical knowledge base building component 512.

While filtering is optional, in one example, if the transfer mapping is not seen at least twice in the training data, it is not used to build transfer mapping database 518, although any other desired frequency can be used as a filter as well. It should also be noted that other filtering techniques can be used, other than frequency of appearance. For example, transfer mappings can be filtered based upon whether they are formed from complete parses of the source sentences and based upon whether the logical forms used to create the transfer mappings are completely aligned.

Component 512 builds transfer mapping database 518, which contains transfer mappings that basically link words and/or logical forms in one language, to words and/or logical forms in the second language. With transfer mapping database 518 thus created, system 500 is now configured for runtime translations.

During translation runtime, a source text 550, to be translated, is provided to parse component 522. Parse component 522 receives source text 550 and creates a source logical form 552 based upon the source text input.

The source logical form 552 is provided to search component 524. Search component 524 attempts to search the transfer mapping database 518 in order to obtain transfer mappings that cover all or portions of source logical form 552. Multiple mappings may be found for one or more of the nodes in source logical form 552.

After a set of possible transfer mappings and a set of possible combinations of transfer mappings are found, decoding component 554 scores each combination of transfer mappings using a plurality of models. Under one embodiment, the individual transfer mappings and combinations of transfer mappings are scored with a linearly interpolated score that will be explained in greater detail below. After scores are generated, decoding component 554 picks and stores the best combination of transfer mappings.

Transfer component 526 receives the best combination of candidate mappings from decoding component 554 and builds a target logical form 556 that will form the basis of the target translation. This is done by combining the nodes of the selected transfer mappings.

In cases where no applicable transfer mappings are found by search component 524, the nodes in source logical form 552 and their relations are simply copied into the target logical form 556. Default single word translations may still be found in transfer mapping database 518 for these nodes and inserted in target logical form 556. However, if none are found, translations can illustratively be obtained from association list 520, which was used during alignment.

Generation component 528 is illustratively a rule-based, application-independent generation component that maps from target logical form 556 to the target text (or target string) 558. Generation component 528 can alternatively utilize a machine learned approach to sentence realization. Generation component 528 may illustratively have no information regarding the source language of the input logical forms, and works exclusively with information passed to it by transfer component 526. Generation component 528 also illustratively uses this information in conjunction with a monolingual (e.g., for the target language) dictionary to produce target text 558. One generic generation component 528 is thus sufficient for each language.

Statistical Machine Translation of Logical Forms

With respect to the following discussion, those skilled in the art should recognize that dependency graphs, logical forms, semantic structures, semantic relationships and semantic representations all relate to and describe the input logical form as provided during runtime. In addition, those skilled in the art should recognize that transfer mappings or mappings refer to those mappings formed during training.

The following equation, reminiscent of equation 2, is a high-level view of an embodiment of the present invention:

$$T = \arg\max_{T'} P(S \mid T') \times P(T') \qquad \text{Equation 3}$$

where T' is constrained to be a logical form in the target language, P(S|T') is the probability of the source logical form S given a target language logical form T', and P(T') is the probability of the target language logical form T', also written as $P_{\mu_T}(T')$ where $\mu_T$ is a target language model. The above equation is equivalent to:

$$T = \arg\max_{T'}[\log P(S \mid T') + \log P_{\mu_T}(T')] \quad \text{Equation 4}$$

An embodiment of the present invention approximates P(S|T') by incorporating several knowledge sources: a channel model or translation model $P_{\mu_C}(S,T')$, a fertility model $P_{\mu_F}(S,T')$, a mapping size information source $Score_{\mu_S}(S,T')$, and a binary features matching (or "rank") information source $Score_{\mu_B}(S,T')$. Incorporating these knowledge sources, P(S|T') is approximated as follows:

$$\log P(S \mid T') \approx \log P_{\mu_C}(S, T') + \quad \text{Equation 5}$$
$$\log P_{\mu_F}(S, T') + Score_{\mu_S}(S, T') + Score_{\mu_B}(S, T')$$

Hence, $$T \approx \arg\max_{T'} \begin{bmatrix} \log P_{\mu_C}(S, T') + \log P_{\mu_F}(S, T') + \\ Score_{\mu_S}(S, T') + Score_{\mu_B}(S, T') + \log P_{\mu_T}(T') \end{bmatrix} \quad \text{Equation 6}$$

The relative contribution of each score or log-probability is weighted by a factor ($\lambda_T, \lambda_C, \lambda_F, \lambda_S,$ and $\lambda_B$), and the resulting linear interpolated approximation is:

$$T \approx \arg\max_{T'} \begin{bmatrix} \lambda_C \cdot \log P_{\mu_C}(S, T') + \lambda_F \cdot \log P_{\mu_F}(S, T') + \\ \lambda_S \cdot Score_{\mu_S}(S, T') + \lambda_B \cdot Score_{\mu_B}(S, T') + \\ \lambda_T \cdot \log P_{\mu_T}(T') \end{bmatrix} \quad \text{Equation 7}$$

In practice, this embodiment does not score an entire source logical form and target language logical form all at once. Rather, the search (represented in the above equations by the "argmax") builds a target language logical form, one translation mapping at a time. In doing so, it employs a score for each mapping. The total linearly interpolated score for a transfer mapping m is represented by:

$$SCORE(m) = \log P(m) = \lambda_T \cdot \log P_{\mu_T}(m) + \lambda_c \cdot \log P_{\mu_C}(m) + $$
$$\lambda_F \cdot \log P_{\mu_F}(m) + \lambda_S \cdot Score_{\mu_S}(m) + \lambda_B \cdot Score_{\mu_B}(m) \quad \text{Equation 8}$$

As in the full approximation and as indicated above, each information source score or probability is weighted by a factor. These factors ($\lambda_T, \lambda_C, \lambda_F, \lambda_S,$ and $\lambda_B$) or weights are trained by using Powell's algorithm to maximize the BLEU score on the output of the system. Powell's algorithm is known in the art. An example of this algorithm is described in an article by Powell entitled "An Efficient Method of Finding the Minimum of a Function of Several Variables without Calculating Derivates." (*Computer Journal*, 7:155-162). The BLEU score is also known in the art and is described in an article by Papineni, Roukos, Ward, and Zhu titled—"Bleu: a method for automatic evaluation of machine translation." 2001. IBM Technical Report RC22176 (W0109-022), IBM Research Division, Thomas J. Watson Research Center.

Models

Figure 6:
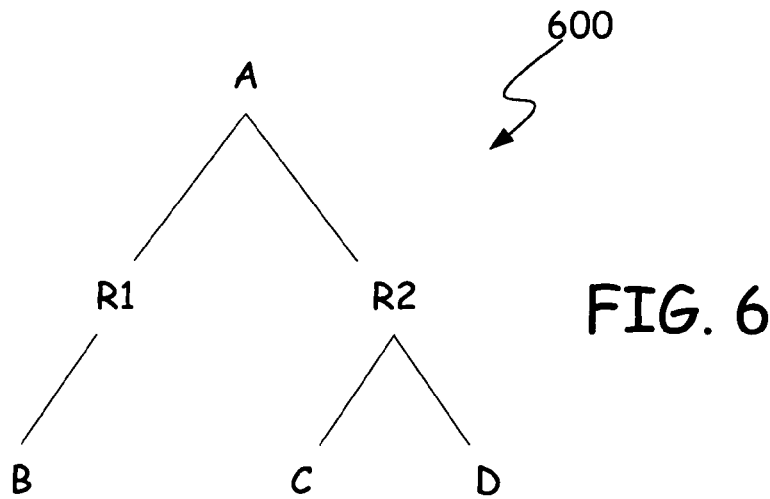
FIG. 6 illustrates an example target logical form on the target side of a transfer mapping.

Under one embodiment, the target language model is an n-gram model that provides the probability of a node in a target dependency graph given a sequence of n-1 preceding nodes and relationships. FIG. 6 illustrates an example target dependency graph 600, which can be found on the target side in transfer mapping database 518. In FIG. 6, nodes A, B, C, and D contain word forms. Nodes B, C and D are children nodes and node A is a parent node or root node. Nodes R1 and R2 are semantic relationship nodes.

Using this n-gram model, the probability of the entire target dependency graph τ 600 given the target language model is equal to the product of the n-gram probabilities of each of the nodes. Thus, the probability of target dependency graph 600 given the target language model is represented by the following formula:

$$P_{\mu_T}(\tau) = \prod_i P_{\mu_T}(c_i \mid c_{i-1} \ldots c_{i-(n-1)}) \quad \text{Equation 9}$$

where i is an index over all nodes in the logical form τ. For each node $c_i$, the score according to the target language model is the probability of $c_i$ given its n-1 nearest ancestors, $c_{i-1}$ through $c_{i-(n-1)}$. For example, the probability of target logical form 600 according to a trigram model of this kind would be:

$$P_{\mu_T}(\tau) = \quad \text{Equation 10}$$
$$P(A \mid ROOT) \cdot P(R1 \mid ROOT, A) \cdot P(R2 \mid ROOT, A) \cdot P$$
$$(B \mid A, R1) \cdot P(C \mid A, R2) \cdot P(D \mid A, R2) \cdot P$$
$$(LEAF \mid R1, B) \cdot P(LEAF \mid R2, C) \cdot P(LEAF \mid R2, D)$$

In this trigram model, the semantic relationships (R1, R2) are treated as first-class entities such that the target model is simplified so that separate models for lemmas and semantic relationships are unneeded. The target model is pruned by removing infrequently occurring n-grams and smoothed using interpolated absolute discounting, which is known in the art and described in an article by Ney, Essen, and Kneser titled "On structuring probabilistic dependences in stochastic language modeling." 1994. (*Computer Speech and Language*, 8:1-38).

The channel model predicts the probability of the source logical form given the target logical form P(S|T). In one embodiment, we define a transfer mapping cover M for a given source logical form S and a target logical form T as a set of transfer mappings from S to T (denoted as M:S→T). The probability of the source logical form S given the target logical form T is estimated by:

$$P(S \mid T) = \sum_{M_i : S \to T} \prod_{m \in M_i} P_{\mu_C}(m) \quad \text{Equation 11}$$

where i ranges (potentially) over all transfer mapping covers $M_i$:S→T, and $$P_{\mu_C}(m) = \frac{\text{count}(m_S, m_T)}{\text{count}(m_T)} \quad \text{Equation 12}$$

defines the probability of a mapping m according to the channel model $\mu_c$. The expression count($m_s,m_T$) is the number of times the structure on the source side of mapping m was mapped into the structure on the target side of mapping m in a set of training data, and count($m_T$) is the number of times the structure on the target side of mapping m was found as the target side of any mapping in the training data.

In other words, the probability, according to the channel model $\mu_c$ of a transfer mapping m, is estimated by dividing how many times the source side of a transfer mapping was encountered with the target side of a transfer mapping count ($m_S, m_T$) (in a logical form bitext) by how many times the target side of that transfer mapping was encountered count ($m_T$).

The channel model also uses overlapping transfer mappings. Thus, the probability calculated in Equation 12 is the unnormalized probability. The unnormalized probability can be normalized such that the channel model does not favor certain mappings that have more overlap than others.

Figure 7:
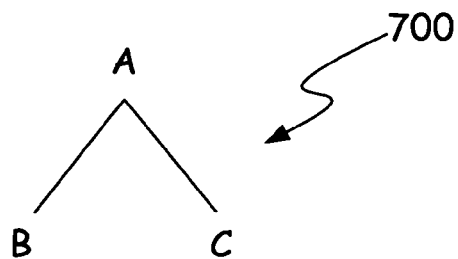
FIG. 7 illustrates an example of an input logical form.
Figure 8:
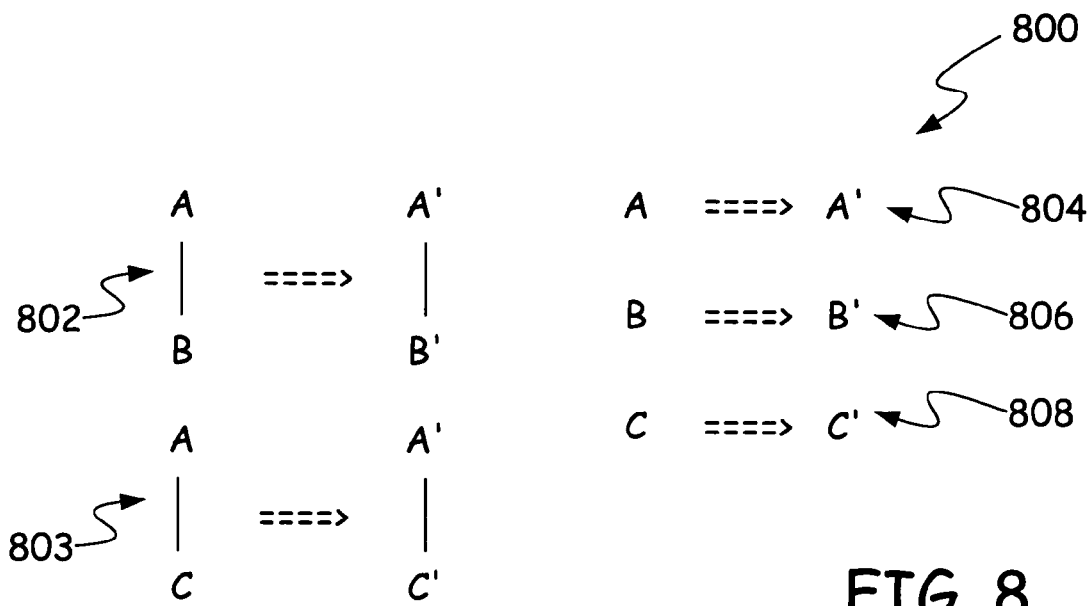
FIG. 8 illustrates example transfer mappings stored in a transfer mapping database.

FIG. 7 illustrates an input LF 700 and FIG. 8 illustrates transfer mappings 800 found in transfer mapping database 518. Transfer mappings 800 include mappings 802, 803, 804, 806 and 808. For ease of illustration, only the nodes for the lemmas in the transfer mappings are shown in the figures of the present application and the nodes for the semantic relationships are not shown. It should be noted that the transfer mappings include additional nodes for the semantic relationships. However, since these nodes are treated in the same manner as nodes for lemmas under the present invention, the figures and discussion below are limited to discussing only the lemma nodes.

Mappings 800 may be combined in a number of different ways to cover all of the nodes of source LF 700. For example, mapping 802 may be combined with mapping 808, mapping 803 may be combined with mapping 806, and mappings 804, 806 and 808 may be combined together. Each of these combinations is non-overlapping because each node in the source LF 700 is only covered by a single transfer mapping. However, another way to combine mappings 800 to cover all of source LF 700 is to combine mapping 802 with mapping 803. This forms an overlapping mapping because source node A is covered by both mapping 802 and mapping 803.

To prevent the channel model from favoring overlapping mappings, the channel model is normalized. The normalized probability $P_{\mu_C}^N(m)P_N$ for a mapping m given the channel model $\mu_c$ is computed by:

$$P_{\mu_c}^N(m) = P_{\mu_c}(m)^{\frac{new}{total}} \qquad \text{Equation 13}$$

where "new" is the number of previously uncovered constituents or nodes in the input graph, "total" is the total number of constituents of the source side transfer mappings and $P_{\mu_C}(m)$ is the unnormalized probability of a transfer mapping according to the channel model, as defined earlier. Thus, Equation 13 illustrates that the normalized probability of a transfer mapping according to the channel model is equal to the unnormalized probability of the transfer mapping according to the channel model having the illustrated exponent.

As previously discussed, in some instances, a node in the input LF is not found in the training data because it could not be parsed, it simply didn't show up, or it was filtered out of transfer mapping database 518 because its frequency was below a predetermined threshold (usually one). In these cases, a default node is inserted, which is formed using a single-word translation from a dictionary. The probability for this default mapping can be determined using IBM Model 1 trained on a bilingual text. Because this probability is obtained in a different manner from the other channel probabilities, the default mapping probability is adjusted by a weight ($\lambda_L$) before being combined with the other channel probabilities. In addition, if no probability can be determined for the default mapping, a default value of ($\lambda_A$) is used. The weights $\lambda_L$ and $\lambda_A$, like the rest of the weights used in the translation system, are trained using Powell's algorithm to maximize the BLEU score for a set of training sentences. It should be noted that these parameters are separate from the weight ($\lambda_C$) associated with the channel model in computing the final score for a transfer mapping as illustrated in Equation 8.

The channel model operates differently from the target language model. Specifically, the channel model promotes accuracy in translation, while the target language model promotes fluency in the target language without regard to the source language.

Figures 9, 10:
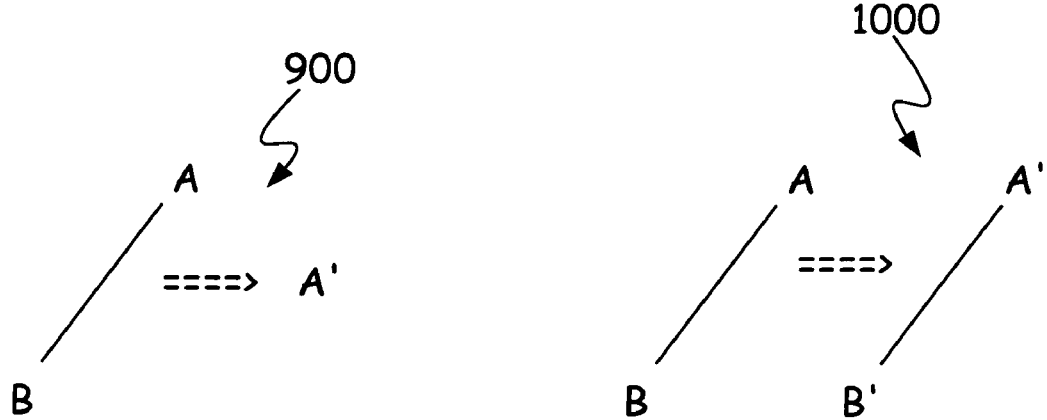
FIGS. 9 and 10 illustrate example transfer mappings stored in a transfer mapping database.

The target language model suffers from a liability in that it prefers smaller graphs to larger ones. As a result, the target language model favors mappings that delete a node in the target structure over mappings that keep the same number of nodes in the source and target structures or that add a node in the target structure. For example, FIGS. 9 and 10 illustrate that training database 518 contains transfer mappings 900 and 1000. Transfer mapping 900 illustrates that there is one less node on the target side than on the source side. Transfer mapping 1000 illustrates that there are the same number of nodes on the source side and the target side of the mapping. The target language model will score mapping 900 higher than mapping 1000 because there are fewer probabilities in the product for the target LF fragment resulting from mapping 900 than in the fragment resulting from mapping 1000.

The fertility model helps to overcome this problem by providing a score based on the number of times nodes are deleted in mappings in the training data. If nodes are rarely deleted in the training data, the fertility model will provide a higher score for mappings that do not have deletions.

The fertility model is calculated by reviewing the training data and counting, for each node on the source side of the transfer mapping, how often there is a corresponding node in the target side of the transfer mappings. To avoid sparse data problems, counts for the lemmas are grouped together by parts of speech while counts for the semantic relationships (the number of which is approximately equal to the number of parts of speech) are maintained separately. These frequencies are then used to estimate the probability of a deletion occurring.

For each part of speech or semantic relationship label x, an entry in a fertility table is represented by:

$$F[x] = \frac{\text{count}(x \in m_t, x \in m_s)}{\text{count}(x \in m_s)} \qquad \text{Equation 14}$$

In other words, the fertility table entry for constituent x is populated by computing the ratio of the number of times x was encountered in both the target structure and the source structure and the number of times constituent x was encountered in the source structure. Therefore, the probability of a transfer mapping m according to the fertility model $\mu_F$ is computed by:

$$P_{\mu_F}(m) = \prod_{c \in m_s} f(c)$$ Equation 15 wherein $$f(c) = \begin{cases} F[x] & \text{if } \exists c_t \in m_t: c_t \text{ corresponds to } c_s \\ 1 - F[x] & \text{otherwise} \end{cases}$$

In other words, if a node of the target corresponds with a node of the source, then f(c) is the fertility table entry F[x]. Otherwise, f(c) is 1−F[x].

The next information source is the mapping size score, which takes into account the number of nodes on the source side of the transfer mappings. This information source assigns a score computed by:

$$\text{Score}_{\mu_S}(m) = |m|$$ Equation 16

In effect, the size score gives preference to larger mappings on the assumption that mappings with more context information are likely to be better than mappings with less context information. With reference to FIGS. 9 and 10, transfer mapping 900 would receive a score of two because there are two nodes on the source side. Transfer mapping 1000 also would receive a score of two because there are two nodes on the source side.

Figures 11, 12:
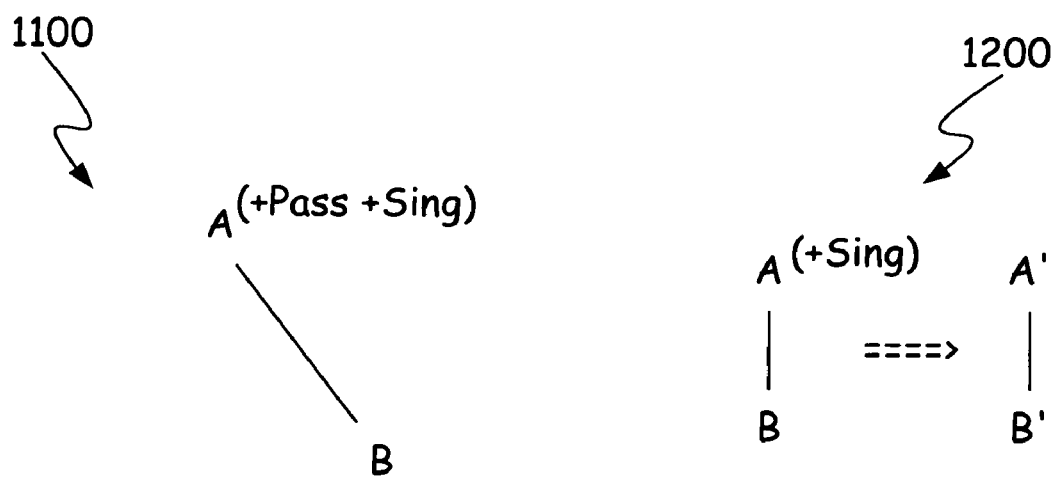
FIG. 11 illustrates an example input logical form.
FIG. 12 illustrates an example transfer mapping stored in a transfer mapping database.

The binary features (or bits) information source takes into account the number of binary features (bits) that match between the input dependency graph and the source side of the transfer mapping. The binary features source provides a rank score that is the sum of the input bits in the source dependency graph that match the bits on the source side of the transfer mapping. FIG. 11 illustrates an input LF 1100 and FIG. 12 illustrates a transfer mapping 1200 stored in transfer mapping database 518. Node A in input LF 1100 specifies that the lemma of node A has a passive bit and a singular bit. Node A of the source side of transfer mapping 1200 specifies that the lemma of node A has a singular bit. Therefore the rank score of transfer mapping 1200 is one because both node A of the input LF 1100 and node A of the source side of mapping 1200 have a matching singular bit.

Figure 13:
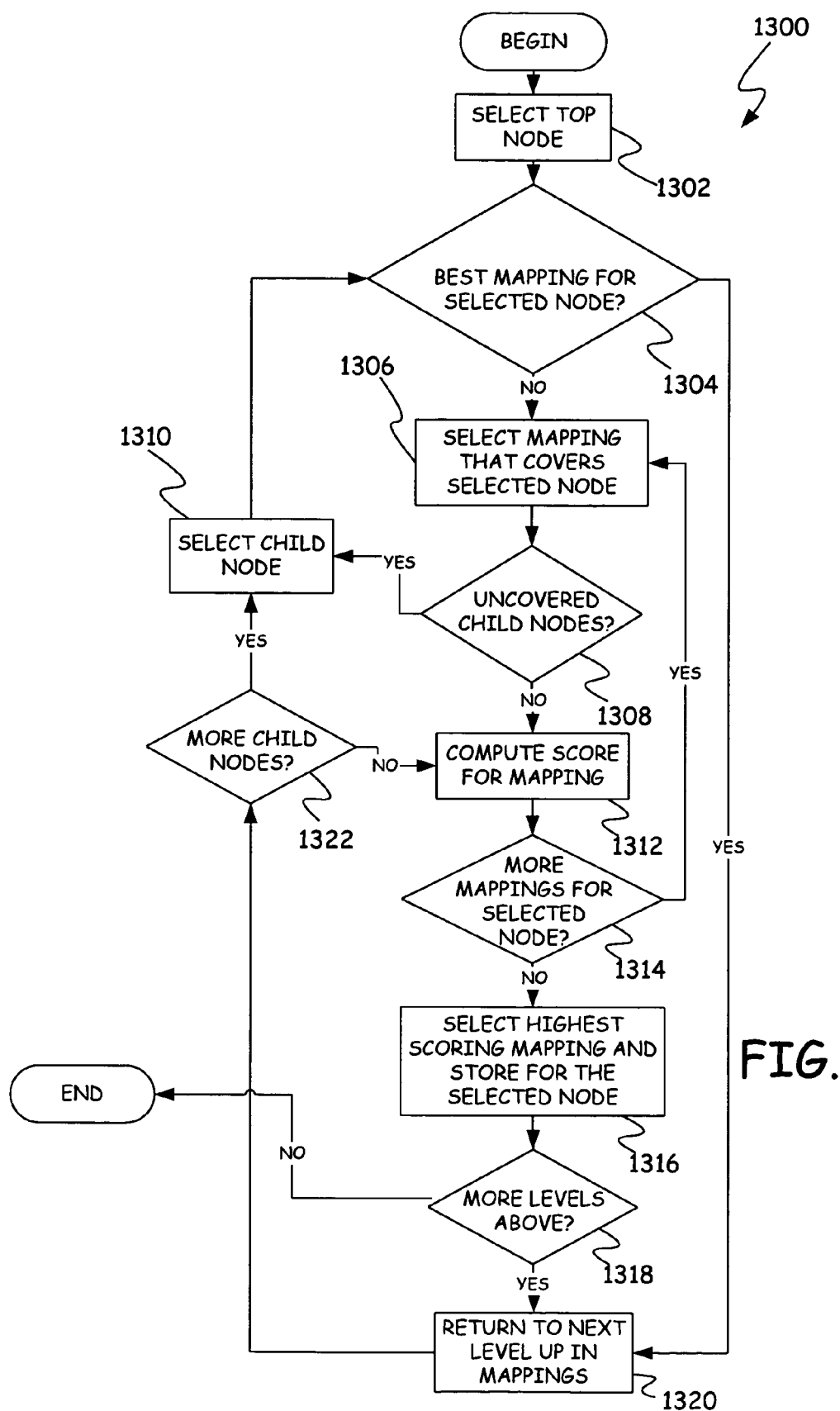
FIG. 13 is a flowchart illustrating a decoding algorithm in accordance with an embodiment of the present invention.
Figure 14:
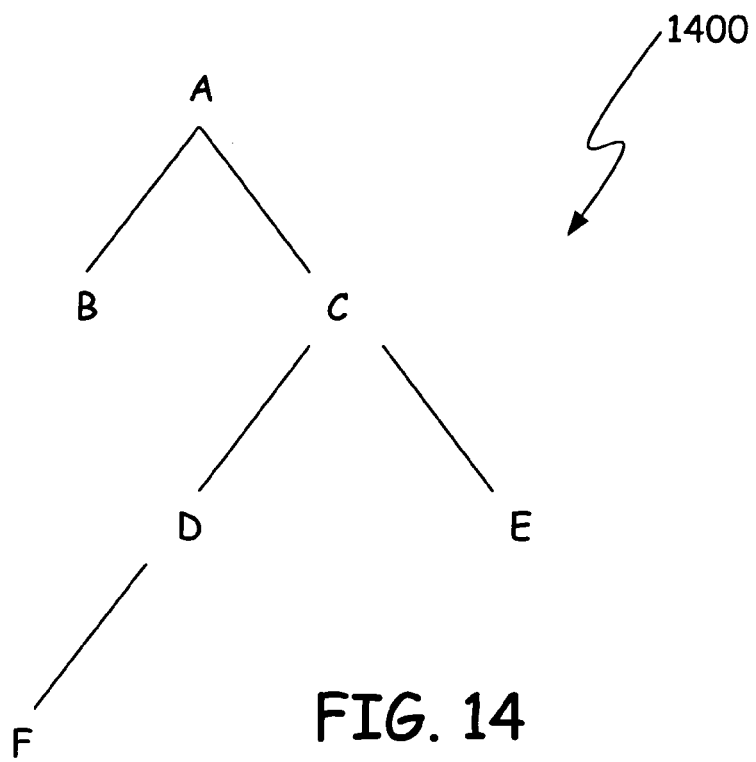
FIG. 14 illustrates an example source logical form with which the flowchart of FIG. 13 can utilize.
Figures 15, 16:
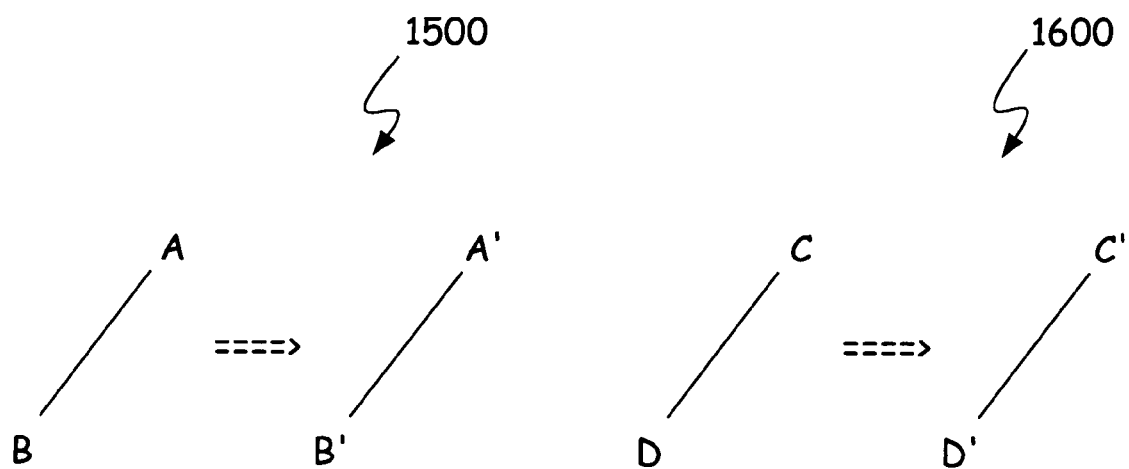
FIGS. 15-21 illustrate example transfer mappings stored in a transfer mapping database with which the flowchart of FIG. 13 can utilize.

FIG. 13 is a flow diagram 1300 illustrating the decoding algorithm as implemented by decoding component 554 of FIG. 5. Decoding component 554 selects and scores sets of transfer mappings in accordance with an embodiment of the present invention. Decoding component 554 uses a top-down search with memoization to find the most probable combination of mappings from the set of transfer mappings found by search component 524. FIG. 14 illustrates source LF 1400 in accordance with an example of the present invention. FIGS. 15-21 illustrate an example set of transfer mappings that were found by search component 524 that relate to source LF 1400.

Decoding component 554 of FIG. 5 begins by selecting the top node of the source LF 1400 as shown in block 1302. In FIG. 14, the top node is node A. After selecting node A, decoding component 554 passes to block 1304 and determines if the best mapping for this node in this context has been identified before. In this example, no mappings for node A have been scored.

The process then continues at step 1306 where a transfer mapping is selected from the set of mappings found by search component 524 that has a source side that covers the selected node. For example, decoding component 554 selects transfer mapping 1500 of FIG. 15.

At block 1308, decoding component 554 determines if there are any nodes in source LF 1400 that are not covered by the selected mapping and that extend directly from the selected mapping. In the example above, mapping 1500 only covers nodes A and B. As such, child node C is not covered by the selected mapping but extends directly from node A, which is covered by the selected mapping. If there is an uncovered child node at step 1308, the process continues at block 1310.

At block 1310, decoding component 554 selects child node C and passes back to block 1304. At block 1304, decoding component 554 determines if a best mapping has already been identified for the selected node in the selected context. In particular for a 3-gram target model, "the selected context" consists of the n−1 target side ancestors of node C (in this case, <PRE_ROOT, PRE_ROOT, A'>). For node C, the best mapping has not been identified so the process continues at step 1306 where decoding component 554 selects a transfer mapping from the set of transfer mappings that covers child node C. For example, decoding component 554 may select transfer mapping 1600 illustrated in FIG. 16. After step 1306, decoding component 554 passes to block 1308 and decides if there are any uncovered child nodes that extend from a node covered by the mapping. In the example above, nodes E and F are uncovered child nodes that extend from nodes covered by mapping 1600. Based on the discovery of uncovered child nodes, decoding component 554 passes to block 1310.

At block 1310, decoding component 554 selects one of the uncovered child nodes, for example node E, and passes back to block 1304. At block 1304, decoding component 554 determines that the best mapping for node E in the currently-active target context (in this case, <PRE_ROOT, A', C'>) has not been determined. The process then continues at block 1306, where decoding component 554 selects a transfer mapping from the set of transfer mappings that covers node E. For example, decoding component 554 selects transfer mapping 1700 illustrated in FIG. 17. Decoding component 554 then passes to block 1308 and decides if the transfer mapping leaves any uncovered child nodes.

According to source LF 1400, node E has no children. Thus, decoding component 554 proceeds to block 1312 to compute a score for the selected transfer mapping. This score is computed using Equation 8 as described above by incorporating all of the above-described models. Note that one reason for adopting the top-down approach of FIG. 13 is to ensure that the context of the nodes (in the mapping being scored) is known, so that the target model (which requires the context) can be used to calculate the target model score.

Figures 17, 18, 19, 20, 21:
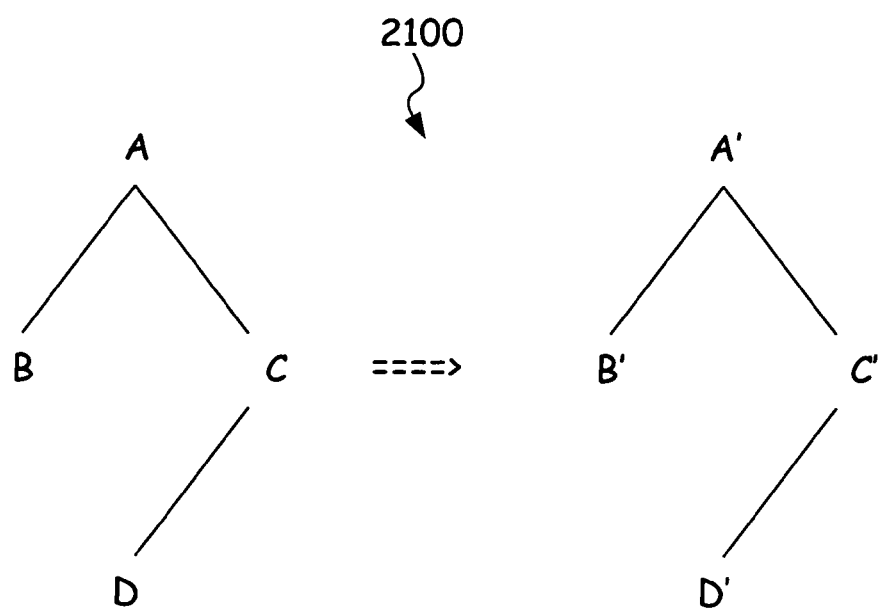

After scoring the mapping, decoding component 554 passes to block 1314 and determines whether there are any more transfer mappings that cover the selected node. In this example, FIG. 18 illustrates another transfer mapping 1800 for selected node E. If there is another transfer mapping, decoding component 554 passes back to block 1306 and selects the additional transfer mapping. For example, mapping 1800 would be selected. In this example, mapping 1800 does not have uncovered child nodes. Thus, decoding component 554 passes through block 1308 to block 1312 where decoding component 554 computes the score of transfer mapping 1800 using Equation 3.

Decoding component 554 then passes to block 1314 to determine if there are more transfer mappings for the selected node. In this example, FIG. 19 illustrates transfer mapping 1900 that covers node E. Again, decoding component passes back to block 1306. In this example, transfer mapping 1900 does not have any uncovered child nodes. Thus, decoding component 554 computes a score for transfer mapping 1900 using Equation 3. After the score is computed, decoding component 554 passes to block 1314.

If decoding component 554 determines that there are no more mappings at step 1314, the process continues at step 1316 where it compares and selects the highest scoring transfer mapping from the transfer mappings that cover the selected node. In the example above, the scores for mappings 1700, 1800 and 1900 are compared and the highest scoring mapping is selected. In this example, the highest scoring transfer mapping is assumed to be transfer mapping 1700. Decoding component 554 stores the node at the head of the mapping, context of the highest scoring mapping (the node that the mapping extends from in the source LF), the score for the highest scoring mapping and each individual model probability or information source scores for the highest scoring mapping. Thus, the target model probability, the channel model probability, the fertility model probability, the size score, and the rank score for the selected mapping are all stored. Although each probability or score for each model is stored, one skilled in the art should recognize that the score determined in Equation 8 is the score that is most important to store.

After the scores for the selected mapping have been stored, decoding component 554 passes to block 1318 where it determines if more levels exist above the selected node. In the example above, the node C is above node E. If there is another level of nodes above the current selected node, decoding component 554 returns to the last mapping that was under consideration for that node at block 1320. In the example above, this involves returning to mapping 1600 of FIG. 16.

At block 1322, decoding component 554 determines if this mapping has any other uncovered child nodes that have not been explored. If there are additional uncovered child nodes to explore, decoding component 554 continues at block 1310, where decoding component 554 selects the uncovered child node. In the example above, this would involve selecting child node F. Decoding component 554 then passes to block 1304 to determine if a best mapping has been identified for this node given its context. If a best mapping has not been determined, decoding component 554 selects a transfer mapping that covers the selected child node at step 1306 (e.g., mapping 2000 of FIG. 20). In this example, transfer mapping 2000 has not previously been scored. At block 1308, decoding component 554 determines that node F has no uncovered child nodes. Thus, decoding component 554 passes to block 1312 and computes a score for node F using Equation 3.

Decoding component 554 passes to block 1314 to determine if node F has more transfer mappings. In this example, no other transfer mappings cover node F. Thus, decoding component 554 stores the score for transfer mapping 2000 and stores each individual model probability or information source score for mapping 2000, the n-a nodes of target-side context in which transfer mapping 2000 was evaluated, the input node corresponding to the head node of transfer mapping 2000 and the total score for transfer mapping 2000.

In this example, more levels of source LF 1400 exist above node F. So, decoding component 554 passes to block 1320 and returns to the last mapping for node C that was under consideration. At block 1322, decoding component 554 determines that the selected mapping for node C has no more uncovered children. So, decoding component 554 passes to block 1312 and computes a total score for transfer mapping 1600.

If the selected mapping had uncovered children, the score for the mapping is determined by combining the scores for the highest scoring mappings for the uncovered child nodes with the score for the selected mapping. For example, the scores for mapping 1700 and 2000 would be combined with the score for mapping 1600 to provide a total score for the entire mapping below node C in the source LF.

Under one embodiment, each component of the mapping scores are combined separately. Thus, the total target model probability of mapping 1600 is:

$$T_{\mu_T} = \log P_{\mu_T}(m_{1700}) + \log P_{\mu_T}(m_{2000}) + \log P_{\mu_T}(m_{1600}) \quad \text{Equation 17}$$

where $P_{\mu_T}(m_{1700})$ is the target model probability for mapping 1700, $P_{\mu_T}(m_{2000})$ is the target model probability for mapping 2000 and $\log P_{\mu_T}(m_{1600})$ is the target model probability for mapping 1600.

Similarly, the total channel model probability of mapping 1600 is:

$$T_{\mu_C} = \log P_{\mu_C}(m_{1700}) + \log P_{\mu_C}(m_{2000}) + \log P_{\mu_C}(m_{1600}) \quad \text{Equation 18}$$

and the total fertility model probability of mapping 1600 is:

$$T_{\mu_F} = \log P_{\mu_F}(m_{1700}) + \log P_{\mu_F}(m_{2000}) + \log P_{\mu_F}(m_{1600}) \quad \text{Equation 19}$$

The total mapping size score for mapping 1600 is the average of the child mapping size scores and mapping size score for mapping 1600 alone such that:

$$S_{\mu_S} = [\text{Score}_{\mu_S}(m_{1700}) + \text{Score}_{\mu_S}(m_{2000}) + \text{Score}_{\mu_S}(m_{1600})]/3 \quad \text{Equation 20}$$

Like the total mapping size score, the total rank score of mapping 1600 is the average of the child rank scores and the rank score for mapping 1600 alone and is described as:

$$S_{\mu_B} = [\text{Score}_{\mu_B}(m_{1700}) + \text{Score}_{\mu_B}(m_{2000}) + \text{Score}_{\mu_B}(m_{1600})]/3 \quad \text{Equation 21}$$

Once total scores for each component have been determined, they are combined into a single score for the selected mapping using Equation 8 above.

Decoding component 554 then passes to block 1314 and decides whether more transfer mappings exist for node C. In this example, no other transfer mappings exist for node C, so decoding component 554 selects transfer mapping 1600 as having the highest scoring mapping and stores the total score for mapping 1600, the context (node A) of mapping 1600, the head node of mapping 1600 (node C) and the individual total component scores for mapping 1600.

At block 1318, decoding component 554 decides whether more levels exist above node C in source LF 1400. In this example, node A is above node C. Thus, decoding component 554 returns to the next level up in the mappings as illustrated in block 1320. In the example above, this involves returning to mapping 1500 of FIG. 15. At block 1322, decoding component 554 determines if the selected mapping has any other uncovered child nodes that need to be explored. In this example, there are no other uncovered child nodes, so decoding component 554 passes to block 1312 and computes a total score for transfer mapping 1500. Like mapping 1600, the total score for transfer mapping 1500 is formed by combining the scores for mapping 1600 with the scores for mapping 1500.

Decoding component 554 then passes to block 1314 and determines if more transfer mappings exist for node A. In this example, transfer mapping 2100 also covers node A. As a result, the process returns to step 1306 to select transfer mapping 2100.

At step 1308, the process determines that mapping 2100 has an uncovered child node. Specifically, nodes E and F are not covered by mapping 2100. At step 1310, node E is selected and the process returns to step 1304 to determine if a best mapping has been selected for node E in the current context given our previous choice of mapping 2100, which in this case would be <PRE_ROOT, A', C'>. Such a best mapping was selected (mapping 1700). This best mapping and its scores are then selected and the process returns to mapping 2100 at step 1320.

The process then determines if there are more uncovered child nodes to consider. For mapping 2100, child node F has not been considered and is selected at step 1310. At step 1304, it is determined that a best mapping for node F in the context of node D has been determined (mapping 2000). This best mapping is then selected and the process returns to mapping 2100 at step 1320.

Upon returning to step 1322, there are no further uncovered child nodes to consider and a score for mapping 2100 is computed using the stored scores for mappings 1700 and 2000 and the individual mapping scores for mapping 2100. As above, the individual components of the mapping score are combined separately.

At step 1314, no other transfer mappings exist, so decoding component 554 passes to block 1316 and selects between the transfer mapping structure headed by transfer mapping 1500 and the transfer mapping structure headed by transfer mapping 2100 based on the total scores for these two mapping structures. Decoding component 554 stores the total score for the highest scoring transfer mapping structure and passes to block 1318. At block 1318, decoding component determines whether more levels exist above node A. In this example, node A is the top node in source LF 1400, so decoding component 554 ends the decode and returns the highest scoring transfer mapping structure determined for node A.

Based on the highest stored scoring transfer mapping illustrated in FIGS. 15-21, transfer component 526 can build a target LF. For example, if transfer mappings 1500, 1600, 1700 and 1900 were selected as the highest scoring transfer mappings and, therefore, have the highest probability of a target translation, they are combined to form a target LF.

Information sources, such as statistical models and other scoring techniques are used in the present invention to determine the best translation for a semantic structure. Input semantic structures have been used to generate output semantic structures by using a greedy search algorithm (in one embodiment) against a set of transfer mappings. However, the greedy search algorithm does not test all possible combinations of transfer mappings but simply selects the first set of transfer mappings that completely cover the input semantic structure. Statistical models have been used to predict the most likely output string given an input string. However, statistical models used in string-based systems assume that an element can be predicted based on another adjacent or almost adjacent element. Thus, the present invention uses statistical models to predict the best translation for a semantic structure.

Although the target language model, as applied to semantic structures of the present invention can be used in building output word strings, the target language model as applied to semantic structures can be used in other language programs. For example, other systems include speech recognition, optical character recognition, handwriting recognition, information extraction, and grammar checking.

Although the present invention has been described with reference to particular embodiments, workers skilled in the art will recognize that changes may be made in form and detail without departing from the spirit and scope of the invention.

What is claimed is:

1. A method of decoding an input semantic structure to generate an output semantic structure, the method comprising:
   providing a set of transfer mappings that cover at least portions of an input semantic structure that relates to an input word string of a first language, each transfer mapping having an input semantic side that describes at least one nodes of the input semantic structure and having an output semantic side that describes at least one node of the output semantic structure;
   using a processor to calculate a score for each of the set of transfer mappings which cover at least a select node of the input semantic structure using a statistical model, wherein calculating the score for each transfer mapping comprises combining scores of the highest scoring mappings for each child node of the select node not covered by the transfer mapping with the score of the transfer mapping;
   using the processor to select the highest scoring transfer mapping of the set of transfer mappings which cover the at least one select node; and
   using the processor to construct an output semantic structure that relates to an output word string of a second language using the selected highest scoring transfer mapping.

2. The method of claim 1, wherein calculating a score for each transfer mapping in the set of transfer mappings that describe a select node of the input semantic structure comprises calculating the score using a target language model that provides a probability of a set of nodes appearing in the output semantic structure.

3. The method of claim 1, wherein calculating a score for each transfer mapping in the set of transfer mappings that describe a select node of the input semantic structure comprises calculating the score using a channel model that provides a probability of an input semantic side of a transfer mapping given the output semantic side of the transfer mapping.

4. The method of claim 3, wherein calculating a score using the channel model comprises normalizing a channel model score based on a number of overlapping nodes between transfer mappings.

5. The method of claim 1, wherein calculating a score for each transfer mapping in the set of transfer mappings that describe a select node of the input semantic structure comprises calculating the score using a fertility model that provides a probability of node deletion in a transfer mapping.

6. The method of claim 1, wherein calculating a score for each transfer mapping in the set of transfer mappings that describe a select node of the input semantic structure comprises calculating a size score based on a number of nodes in the input semantic side of the transfer mapping.

7. The method of claim 1, wherein calculating a score for each transfer mapping in the set of transfer mappings that describe a select node of the input semantic structure comprises calculating a rank score based on a number of matching binary features in the input semantic structure and the input semantic side of the transfer mapping.

8. The method of claim 1, wherein calculating a score for each transfer mapping in the set of transfer mappings that describe a select node of the input semantic structure comprises:
   computing separate scores for a plurality of models; and
   combining the separate scores to determine the score for each transfer mapping that describe a select node of the input semantic structure.

9. The method of claim 8 wherein the plurality of models comprises a channel model that provides a probability of an input semantic side of a transfer mapping given the output semantic side of the transfer mapping.

10. The method of claim 8 wherein the plurality of models comprises a fertility model that provides a probability of node deletion in a transfer mapping.

11. The method of claim 8 wherein the plurality of models comprises a target language model that provides a probability of a set of nodes appearing in the output semantic structure.

12. The method of claim 8 and further comprising:
computing a size score for each transfer mapping that describes a select node of the input semantic structure, the size score based on a number of nodes in the input semantic side of each transfer mapping; and
combining the size score with the separate scores for the plurality of models to determine the score for each transfer mapping that describe a select node of the input semantic structure.

13. The method of claim 8 and further comprising:
computing a rank score for each transfer mapping that describe a select node of the input semantic structure, the rank score based on a number of matching binary features in the input semantic structure and the input semantic side of each transfer mapping; and
combining the rank score with the separate scores for the plurality of models to determine the score for each transfer mapping that describe a select node of the input semantic structure.

14. The method of claim 8 wherein combining the separate scores comprises:
multiplying each score by a weight to form weighted model scores; and
summing the weighted model scores to determine the score for each transfer mapping that describe a select node of the input semantic structure.

15. The method of claim 1, wherein providing a set of transfer mappings comprises providing a set of transfer mappings arranged as a tree structure and multiple levels of nested subtrees comprising a root transfer mapping and subtrees, each subtree comprising a root transfer mapping, wherein each transfer mapping in the set of transfer mappings appears as a root transfer mapping in at least one of the tree and subtrees.

16. The method of claim 15 wherein calculating a score for each of the set of transfer mappings comprises calculating a score for a tree of transfer mappings through steps comprises:
recursively calculating a score for each level of nested subtrees, wherein calculating a score for a subtree comprises recursively scoring the subtrees of the subtree, calculating a score for the root transfer mapping of the subtree, and combining the scores for the subtrees of the subtree with the score for the root transfer mapping of the subtree;
calculating a score for the root transfer mapping; and
combining the score for each subtree with the score for the root transfer mapping.

17. The method of claim 16 wherein computing a score for a root transfer mapping comprises computing a size score for the root transfer mapping based on a number of nodes in the input semantic side of the root transfer mapping.

18. The method of claim 16, wherein combining the score of subtrees with the score for a root transfer mapping comprises combining size scores for the subtrees with the size score for the root transfer mapping by averaging the size scores for the subtrees with the size score for the root transfer mapping.

19. The method of claim 16 wherein computing a score for a root transfer mapping comprises computing a rank score for the root transfer mapping based on a number of matching binary features in the input semantic structure and the input semantic side of the root transfer mapping.

20. The method of claim 19, wherein combining the score of subtrees with the score for a root transfer mapping comprises combining rank scores for the subtress with the rank score of the root transfer mapping by averaging the rank scores for the subtrees with the rank score of the root transfer mapping.

21. A machine translation system for translating an input in a first language into an output in a second language, the system comprising:
a processor;
a computer storage medium having stored thereon computer executable instructions for configuring the processor to implement system components comprising:
a parser for parsing the input into an input semantic representation;
a search component configured to find a set of transfer mappings, wherein each transfer mapping includes an input semantic side that corresponds with portions of the input semantic representation;
a decoding component configured to score each of the set of transfer mappings that corresponds with a select portion of the input semantic representation and to select which of the transfer mappings that correspond with the select portion of the input semantic representation has a highest score, wherein scoring each of the set of transfer mappings includes combining scores of the highest scoring mappings for each child node of the select node not covered by the transfer mapping with the score of the transfer mapping; and
a generation component configured to generate the output based on the selected transfer mapping.

22. The machine translation system of claim 21, wherein the decoding component scores each transfer mapping by using a plurality of statistical models.

23. The machine translation system of claim 22, wherein the output comprises an output semantic representation and wherein the plurality of statistical models comprises a target model that provides a probability of a sequence of nodes appearing in the output semantic representation.

24. The machine translation system of claim 22, wherein the plurality of statistical models comprises a channel model that provides a probability of a set of semantic nodes in an input side of a transfer mapping given a set of semantic nodes in an output side of the transfer.

25. The machine translation system of claim 22, wherein the plurality of statistical models comprises a fertility model that provides a probability of a node deletion in the transfer mapping.

26. The machine translation system of claim 22, wherein the decoding component scores each transfer mapping using a size score based on a number of nodes in an input side of the transfer mapping.

27. The machine translation system of claim 22, wherein the decoding component scores each transfer mapping using a rank score based on a number of matching binary features between the input and an input side of the transfer mapping.

28. A method of determining a score for a word string, the method comprising:
using a processor to compute an input semantic structure having a plurality of nodes that relate to an input word string;

using the processor to obtain a set of transfer mappings, each of the set of transfer mappings including an input semantic side that describes at least one node of the input semantic structure; and using the processor to score each of the set of transfer mappings which cover at least a select node of the input semantic structure with a target language model that provides a probability of sequences of nodes appearing in an output semantic structure having a plurality of nodes that relate to an output word string, wherein scoring each transfer mapping comprises combining the highest scoring mappings for each child node of the select node not covered by the transfer mapping with the score of the transfer mapping; and using the processor to select the highest scoring transfer mappings of the set of transfer mappings which cover at least the select node to compute the output semantic structure that relates to the output word string.

29. The method of claim 28, wherein providing an input semantic structure having a plurality of nodes comprises providing an input semantic structure having a plurality of word nodes and at least one relationship node that describes a semantic relationship between words.

30. The method of claim 28, wherein providing word nodes comprises providing word nodes for lemmas.

31. The method of claim 28, wherein scoring the input word string with a target language model comprises scoring the input word string with the target language model in machine translation.

32. The method of claim 28, wherein scoring the input word string with a target language model comprises scoring the input word string with the target language model in speech recognition.

33. The method of claim 28, wherein scoring the input word string with a target language model comprises scoring the input word string with the target language model in optical character recognition.

34. The method of claim 28, wherein scoring the input word string with a target language model comprises scoring the input word string with the target language model in grammar checking.

35. The method of claim 28, wherein scoring the input word string with a target language model comprises scoring the input word string with the target language model in handwriting recognition.

36. The method of claim 28, wherein scoring the input word string with a target language model comprises scoring the input word string with the target language model in information extraction.

37. The method of claim 1, wherein providing the set of transfer mappings comprises providing root transfer mappings that describe the select node and root transfer mappings that describe any child nodes of the select node.

38. The method of claim 37, wherein combining scores of the highest scoring mappings for each child node of the select node not covered by the transfer mapping with the score of the transfer mapping comprises:

determining whether each transfer mapping that describes the select node also describes any child nodes;

calculating a score for each of the root transfer mappings that describe one of the child nodes of the select node with the statistical model;

selecting which of the root transfer mappings that describe one of the child nodes of the select node has the highest score;

combining scores of the highest scoring root transfer mappings that describe each of the child nodes with a score of the transfer mapping of the select node to find the score for each of the set of transfer mappings that describes the select node.

* * * * *